Patented Sept. 4, 1934

1,972,754

UNITED STATES PATENT OFFICE 1,972,754

PROCESS FOR THE MANUFACTURE OF TANNING SUBSTANCES

Robert Biedermann, Basel, Switzerland, assignor to the firm of J. R. Geigy S. A., Basel, Switzerland No Drawing. Application September 18, 1933, Serial No. 690,032. In Germany September 29, 1932

5 Claims. (Cl. 260—3)

The acid condensation process described in U. S. Patent No. 1,901,536 yields results which are not altogether satisfactory in cases in which the dihydroxy-diarylsulphone or the aromatic sulphonic acid used is insufficiently reactive owing to the presence of substituents. Furthermore the sparing solubility of certain dihydroxy-diphenyl-sulphones may be a hindrance to a satisfactory course of reaction.

The present invention is an improvement in or modification of that described in said Patent No. 1,901,536. According to the invention the aforesaid difficulties can be avoided by heating with an aromatic sulphonic acid in an acid solution a reaction product obtained by condensation of a dihydroxy-diphenyl-sulphone and formaldehyde under alkaline conditions.

It has been found that this procedure leads to a smooth and uniform course of reaction and renders it possible to obtain products which could be made according to the process of the aforesaid patent only with great difficulty or not at all. Furthermore a surprising and valuable result is attained in that leather prepared with the tanning substances of the present invention has a fastness to light which may even exceed that of leather prepared with the tanning substances of the aforesaid patent.

In carrying out the present invention use is made of those dihydroxy-diphenyl-sulphones and sulphonic acids which, owing it may be to their sparing solubility or low reactivity, cannot be brought to reaction by the process of the aforesaid patent or can only be caused to react with difficulty. Instead of dihydroxy-diphenyl-sulphones there may be used their nuclear substitution products, as well as products in which the phenolic hydroxyl groups are etherified.

The following examples illustrate the invention, it being understood that the proportions of the components may vary within wide limits and that the temperatures and duration of heating are not limited strictly to the values therein contained. The parts in the examples are by weight:—

Example 1

120 parts of dimethyl-dihydroxy-diphenyl-sulphone-carbinol of the formula

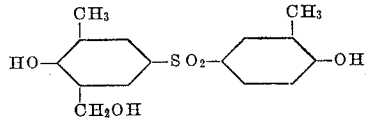

—obtained by treating 100 parts of dimethyl-dihydroxy-diphenyl-sulphone with 72 parts of caustic soda solution of 40 per cent strength, 88 parts of water and 48 parts of an aqueous solution of formaldehyde of 30 per cent strength for 24 hours at 50° C., followed by cautious precipitation by means of hydrochloric acid—are heated for one hour at 106° C. together with 50 parts of water and 100 parts of naphthalene sulphonic acid, obtained by heating 520 parts of naphthalene and 560 parts of sulphuric acid of 93 per cent strength for several hours until a product soluble in water is obtained. After condensation has occurred the product is easily soluble in water. Before the reaction solution is used for tanning purposes it is first neutralized so that its reaction is neutral to Congo.

Example 2

120 parts of dihydroxy-diphenyl-sulphone-carbinol of the formula

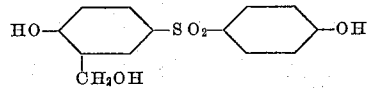

—obtained by heating 100 parts of dihydroxy-diphenyl-sulphone with 80 parts of caustic soda solution of 40 per cent strength, 80 parts of water and 48 parts of an aqueous solution of formaldehyde of 30 per cent strength for 24 hours at 50° C., followed by cautious precipitation by means of hydrochloric acid—are heated for 1¼ to 1½ hours at 106–110° C. with 50 parts of water and 100 parts of diphenyl-glycol-ether-sulphonic acid, obtained by heating 100 parts of diphenylglycol ether with 100 parts of sulphuric acid of 93 per cent strength for 1½ hours at 110° C. The reaction product is further treated as indicated in Example 1; it yields a very light leather of remarkable fastness to light.

Example 3

120 parts of the dihydroxy-diphenyl-sulphone-carbinol made as described in Example 2, 100 parts of ortho-chlorophenol-glycerine-mono-ether-sulphonic acid (obtained by heating 100 parts of ortho-chlorophenol-glycerine-monoether with 80 parts of sulphuric acid of 93 per cent strength for several hours at 90° C.) and 50 parts of water are heated together for 1½ hours at 105–110° C. The reaction mixture, which is very sensitive towards electrolytes, is neutralized with caustic soda solution and the product is precipitated by salting out and dried. For tanning, the dried product is mixed with 10 per cent of its weight of sodium silico fluoride.

*Example 4*

120 parts of the dihydroxy-diphenyl-sulphone-carbinol described in Example 2, 100 parts of anisole sulphonic acid (obtained by heating 100 parts of anisole with 120 parts of sulphuric acid of 93 per cent strength for 2 hours at 110° C.) and 50 parts of water are heated together for 1½ hours at 105–110° C. The product has properties similar to those of the product of Example 3; it is worked up in a similar manner.

*Example 5*

120 parts of dihydroxy-diphenyl-sulphone-carbinol (Example 2), 100 parts of phenol-monoglycol ether sulphonic acid (obtained by heating 100 parts of phenol-monoglycol ether with 110 parts of sulphuric acid of 93 per cent strength for 1½ hours) and 50 parts of water are heated together for 1½ hours at 105–110° C. The further treatment of the product is as described in Example 3.

*Example 6*

120 parts of the carbinol made as described in Example 2, instead of being precipitated by means of hydrochloric acid, are first etherified with 20 parts of glycerine chlorhydrin, with utilization of the caustic soda present in the reaction solution, and the product is then precipitated by means of hydrochloric acid. The resin so obtained is heated with 100 parts of naphthalene sulphonic acid (made as described in Example 1) and 50 parts of water for 1½ hours at 106–110° C. The solution is worked up as described in Example 1.

What I claim is:—

1. A process for the manufacture of tanning substances, consisting in heating a dihydroxy-diphenyl-sulphone-carbinol formed by condensing formaldehyde in alkaline reaction with a dihydroxy-diphenyl-sulphone of sparing solubility and low reactivity, with an aromatic sulphonic acid in aqueous acid solution.

2. A process for the manufacture of tanning substances, consisting in heating a dihydroxy-diphenyl-sulphone-carbinol formed by condensing formaldehyde in alkaline reaction with a dihydroxy-diphenyl-sulphone of sparing solubility and low reactivity with a phenolether sulphonic acid in aqueous acid solution.

3. A process for the manufacture of tanning substances, consisting in heating a dihydroxy-diphenyl-sulphone-carbinol formed by condensing formaldehyde in alkaline reaction with a dihydroxy-diphenyl-sulphone of sparing solubility and low reactivity with naphthalene sulphonic acid in aqueous acid solution.

4. A process for the manufacture of tanning substances, consisting in heating a dihydroxy-diphenyl-sulphone-carbinol formed by condensing formaldehyde in alkaline reaction with a dihydroxy-diphenyl-sulphone of sparing solubility and low reactivity with diphenyl-glycol-ether sulphonic acid in aqueous acid solution.

5. A process for the manufacture of tanning substances, consisting in heating a dihydroxy-diphenyl-sulphone-carbinol formed by condensing formaldehyde in alkaline reaction with a dihydroxy-diphenyl-sulphone of sparing solubility and low reactivity with phenol-monoglycolether sulphonic acid in aqueous acid solution.

ROBERT BIEDERMANN.